(12) United States Patent
Itoh et al.

(10) Patent No.: US 11,359,586 B2
(45) Date of Patent: Jun. 14, 2022

(54) HYBRID VEHICLE

(71) Applicant: TOYOTA JIDOSHA KABUSHIKI KAISHA, Aichi-ken (JP)

(72) Inventors: Hisayuki Itoh, Toyota (JP); Koji Ichikawa, Aichi-ken (JP); Hirokazu Kato, Nisshin (JP); Masaaki Yamaguchi, Okazaki (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/989,896

(22) Filed: Aug. 11, 2020

(65) Prior Publication Data

US 2021/0123396 A1 Apr. 29, 2021

(30) Foreign Application Priority Data

Oct. 29, 2019 (JP) .............................. JP2019-195939

(51) Int. Cl.
| | |
|---|---|
| *F02M 26/50* | (2016.01) |
| *B60K 6/24* | (2007.10) |
| *F02M 35/10* | (2006.01) |
| *F02D 41/00* | (2006.01) |
| *F02M 26/13* | (2016.01) |

(52) U.S. Cl.
CPC .............. *F02M 26/50* (2016.02); *B60K 6/24* (2013.01); *F02D 41/0072* (2013.01); *F02M 26/13* (2016.02); *F02M 35/1038* (2013.01); *F02M 35/10222* (2013.01); *B60Y 2200/92* (2013.01)

(58) Field of Classification Search
CPC ............. F02M 26/50; F02M 35/10222; F02M 35/1038; F02M 26/13; B60K 6/24; B60K 6/445; F02D 41/0072; F02D 41/221; F02D 41/005; F02D 41/0047; F02D 41/0077; F02D 41/22; B60Y 2200/92
See application file for complete search history.

(56) References Cited

U.S. PATENT DOCUMENTS

2016/0348598 A1* 12/2016 Dixon ................... F02D 41/042
2019/0226429 A1* 7/2019 Halleron ................ F02M 26/48

FOREIGN PATENT DOCUMENTS

| JP | 2017133372 A | * | 8/2017 | |
| JP | 2017133372 A | | 8/2017 | |
| WO | WO-2012107950 A1 | * | 8/2012 | ............. F02M 26/39 |

* cited by examiner

*Primary Examiner* — Jacob M Amick
*Assistant Examiner* — Charles J Brauch
(74) *Attorney, Agent, or Firm* — Hauptman Ham, LLP

(57) ABSTRACT

A hybrid vehicle includes an engine, an exhaust gas recirculation device, a traveling motor, and a control device. The exhaust gas recirculation device includes a communication pipe that allows an exhaust pipe and an intake pipe of the engine to communicate with each other and a valve that is provided in the communication pipe. The control device is configured to perform foreign matter removal control for opening and closing the valve when foreign matter caught in the valve is detected and the hybrid vehicle stops.

2 Claims, 4 Drawing Sheets

HYBRID VEHICLE

INCORPORATION BY REFERENCE

The disclosure of Japanese Patent Application No. 2019-195939 filed on Oct. 29, 2019 including the specification, drawings and abstract is incorporated herein by reference in its entirety.

BACKGROUND

1. Technical Field

The disclosure relates to a hybrid vehicle.

2. Description of Related Art

An engine device including an internal combustion engine, an exhaust gas recirculation (EGR) passage that allows an intake passage and an exhaust passage of the internal combustion engine to communicate with each other, and an EGR valve that is provided in the EGR passage has been proposed (for example, see Japanese Unexamined Patent Application Publication No. 2017-133372 (JP 2017-133372 A)). In this engine device, when it is determined that foreign matter is caught between a valve member and a valve seat of the EGR valve, foreign matter removal control for repeatedly performing an operation of opening and closing the EGR valve a plurality of times is performed. In this way, foreign matter caught by the EGR valve is removed.

SUMMARY

In a vehicle in which the engine device is mounted, foreign matter removal control may be performed during travel. In this case, there is a likelihood that a rotation speed of the internal combustion engine will change with a change in an amount of exhaust gas flowing in the EGR passage due to the operation of opening and closing the EGR valve and a driver will feel an uncomfortable feeling such as an accelerating feeling or a decelerating feeling. When an amount of intake air introduced into a combustion chamber of the internal combustion engine via the intake passage is increased to prevent stalling of the internal combustion engine, the likelihood that a driver will feel such an uncomfortable feeling increases.

The disclosure provides a technique of preventing an uncomfortable feeling such as an accelerating feeling or a decelerating feeling from being given to a driver.

According to a first aspect of the disclosure, there is provided a hybrid vehicle. The hybrid vehicle includes an engine, an exhaust gas recirculation device, a traveling motor, and a control device. The exhaust gas recirculation device includes a communication pipe that allows an exhaust pipe and an intake pipe of the engine to communicate with each other and a valve that is provided in the communication pipe. The control device is configured to perform foreign matter removal control for opening and closing the valve when foreign matter caught in the valve is detected and the hybrid vehicle stops.

In the first aspect, the control device is configured to perform foreign matter removal control for opening and closing the valve when foreign matter caught in the valve is detected and the hybrid vehicle stops. Accordingly, it is possible to prevent an uncomfortable feeling such as an accelerating feeling or a decelerating feeling from being given to a driver.

In the first aspect, the control device may be configured to prohibit the foreign matter removal control when foreign matter caught in the valve is detected, the hybrid vehicle stops, and a predetermined time does not elapse from starting of the engine, and may be configured to perform the foreign matter removal control when foreign matter caught in the valve is detected, the hybrid vehicle stops, and the predetermined time elapses from starting of the engine.

In the first aspect, the hybrid vehicle may further include a pressure sensor configured to detect a pressure in the intake pipe as a detected intake air pressure. The control device may be configured to estimate a pressure in the intake pipe as an estimated intake air pressure, and may be configured to determine whether foreign matter is caught in the valve through comparison of an intake air pressure difference between the detected intake air pressure and the estimated intake air pressure with a threshold value.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
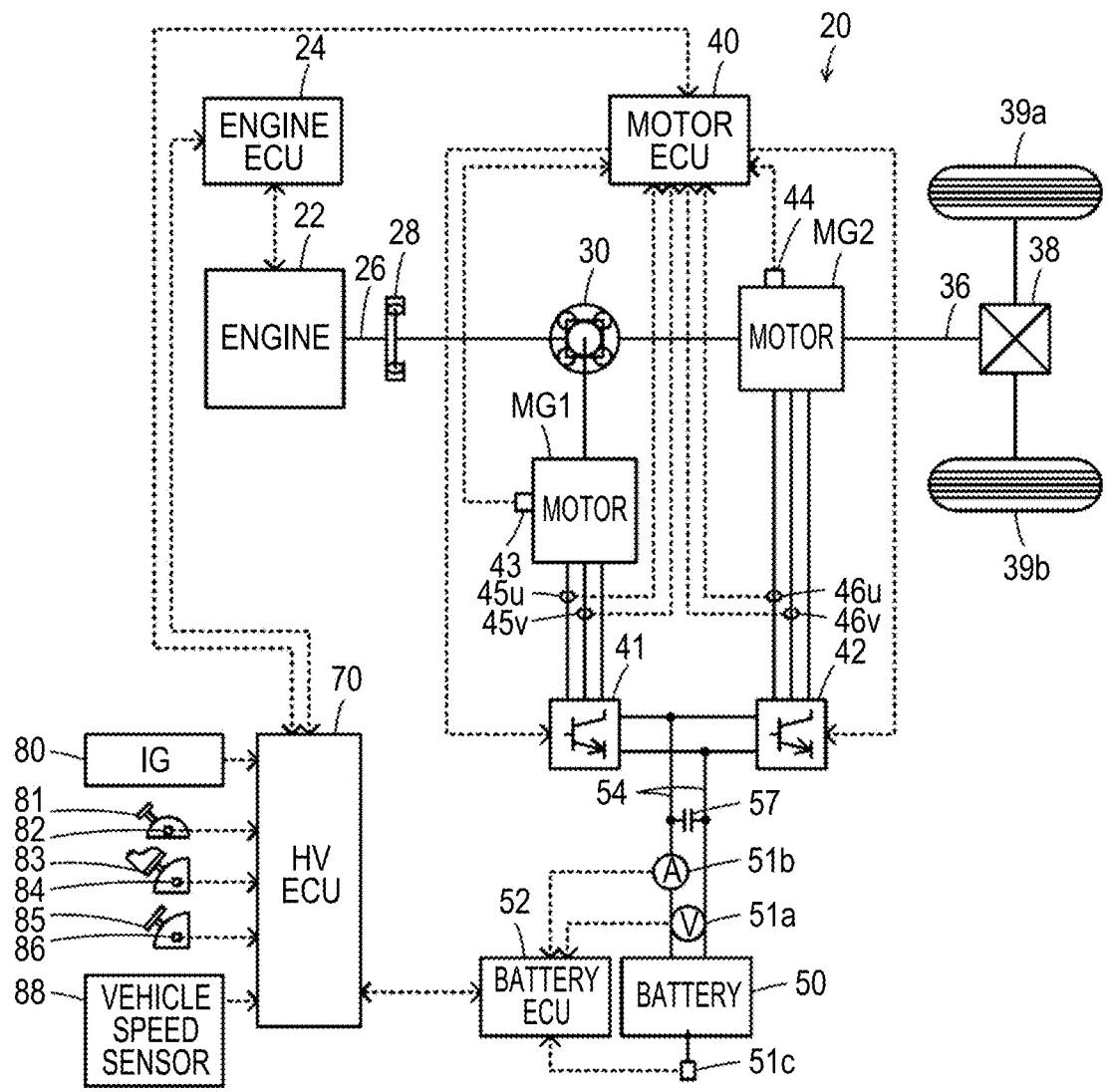
FIG. 1 is a diagram schematically illustrating a configuration of a hybrid vehicle 20 according to an embodiment of the disclosure.
Figure 2:
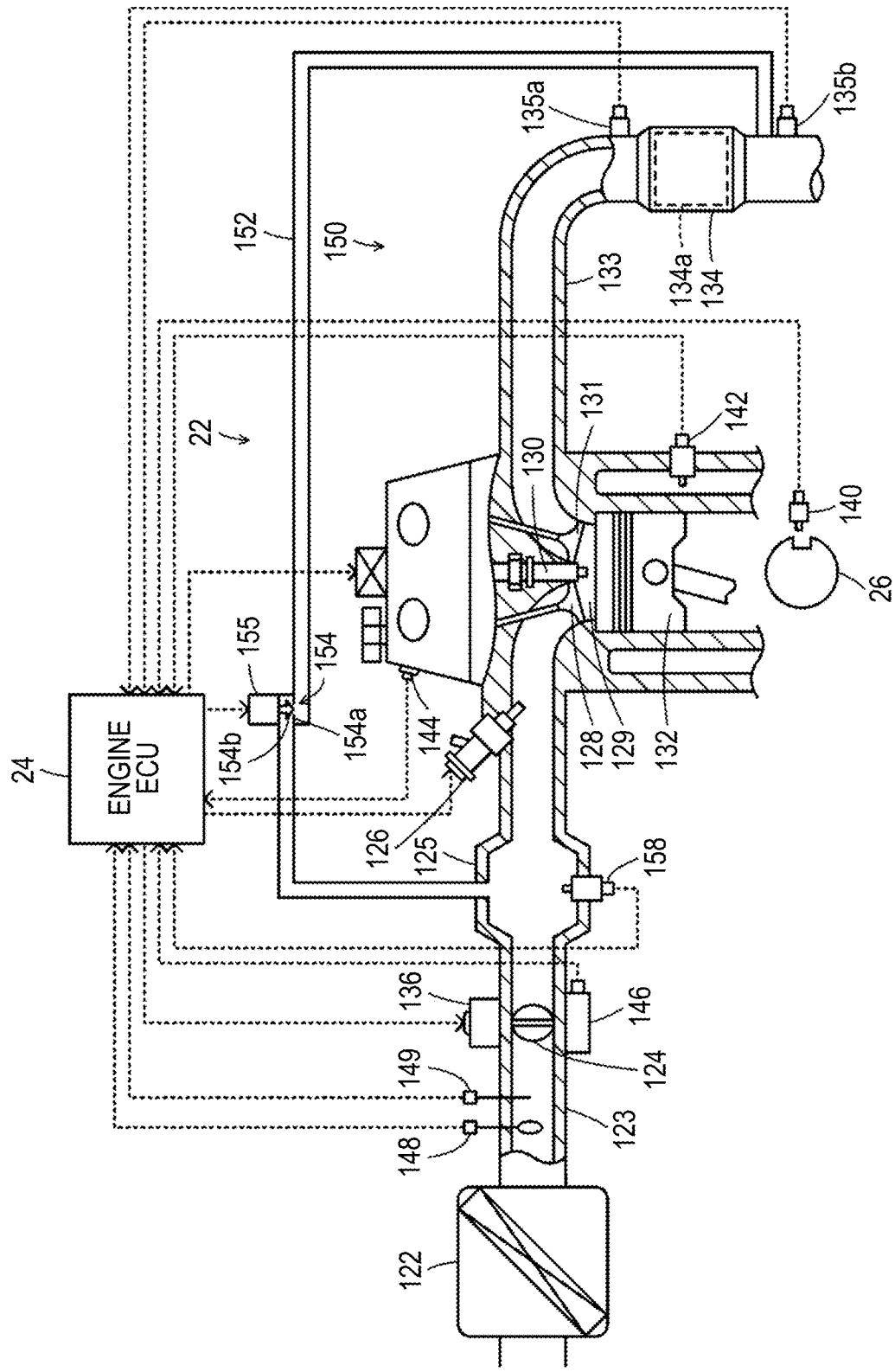
FIG. 2 is a diagram schematically illustrating an engine device which is mounted in the hybrid vehicle 20.

Hereinafter, an embodiment of the disclosure will be described with reference to the accompanying drawings. FIG. 1 is a diagram schematically illustrating a configuration of a hybrid vehicle 20 according to an embodiment of the disclosure. FIG. 2 is a diagram schematically illustrating a configuration of an engine device which is mounted in the hybrid vehicle 20. As illustrated in the drawings, the hybrid vehicle 20 according to an embodiment includes an engine 22, a planetary gear 30, motors MG1 and MG2, inverters 41 and 42, a battery 50 which is a power storage device, and a hybrid electronic control unit (hereinafter referred to as "HVECU") 70.

The engine 22 is configured as an internal combustion engine that outputs power using fuel such as gasoline or diesel. The engine 22 sucks air which is cleaned by an air cleaner 122 into an intake pipe 123, causes the air to flow sequentially through a throttle valve 124 and a surge tank 125, injects fuel from a fuel injection valve 126 downstream from the surge tank 125 of the intake pipe 123, and mixes the air and the fuel. Then, this air-fuel mixture is sucked into a combustion chamber 129 via an intake valve 128 and is exploded and combusted using electric sparks of an ignition plug 130. Then, a translational motion of a piston 132 which is pressed by energy based on the explosion and combustion is converted into a rotational motion of a crank shaft 26. Exhaust gas which is discharged from the combustion chamber 129 to an exhaust pipe 133 via an exhaust valve 131 is discharged to outside air via an exhaust gas control device 134 including a catalyst (a three-way catalyst) 134a that removes harmful components such as carbon monoxide (CO), hydrocarbon (HC), or nitrogen oxide (NOx) and is supplied (recirculated) to the intake pipe 123 via an exhaust gas recirculation device (hereinafter referred to as "EGR device") 150.

The EGR device 150 includes an EGR pipe 152 and an EGR valve 154. The EGR pipe 152 causes a downstream portion of the exhaust pipe 133 with respect to the exhaust gas control device 134 and the surge tank 125 of the intake pipe 123 to communicate with each other. The EGR valve 154 is provided in the EGR pipe 152 and includes a valve seat 154a and a valve member 154b. The valve seat 154a includes a hole with a diameter smaller than the inner diameter of the EGR pipe 152. The valve member 154b is driven by a stepping motor 155 and moves in an axial direction of the valve member 154b (an up-down direction in the drawing). The EGR valve 154 is closed by allowing the valve member 154b to move toward the valve seat 154a (downward in the drawing) such that a tip (a lower end in the drawing) of the valve member 154b closes the hole of the valve seat 154a. The EGR valve 154 is opened by allowing the valve member 154b to move away from the valve seat 154a (upward in the drawing) such that the tip of the valve member 154b is separated from the valve seat 154a to open the hole of the valve seat 154a. The EGR device 150 adjusts an amount of exhaust gas recirculated in the exhaust pipe 133 and recirculates the exhaust gas to the intake pipe 123 by adjusting the opening of the EGR valve 154 using the stepping motor 155. The engine 22 can suck a mixture of air, exhaust gas, and fuel into the combustion chamber 29 in this way. In the following description, this recirculation of exhaust gas is referred to as "EGR" and an amount of recirculated exhaust gas is referred to as an "EGR volume." Operations of the engine 22 and the EGR device 150 are controlled by an engine ECU 24.

Although not illustrated in the drawings, the engine ECU 24 is configured as a microprocessor including a CPU as a main component, and includes a ROM that stores a processing program, a RAM that temporarily stores data, input and output ports, and a communication port in addition to the CPU. Signals from various sensors which are required for controlling the operation of the engine 22 are input to the engine ECU 24 via the input port.

Examples of the signals which are input to the engine ECU 24 include a crank angle θcr from a crank position sensor 140 that detects a rotational position of the crank shaft 26 of the engine 22 and a coolant temperature Tw from a coolant temperature sensor 142 that detects a temperature of a coolant of the engine 22. Examples of the signals also include cam angles θci and θco from a cam position sensor 144 that detects a rotational position of an intake cam shaft opening and closing the intake valve 128 and a rotational position of an exhaust cam shaft opening and closing the exhaust valve 131. Examples of the signals also include a throttle opening TH from a throttle position sensor 124a that detects a position of the throttle valve 124, an amount of intake air Qa from an air flowmeter 148 attached to the intake pipe 123, an intake air temperature Ta from a temperature sensor 149 attached to the intake pipe 123, and an intake air pressure Pind which is a detected value of a pressure in the surge tank 125 and which is supplied from a pressure sensor 158 attached to the surge tank 125. Examples of the signals also include an air-fuel ratio AF from an air-fuel ratio sensor 135a attached to the exhaust pipe 133 and an oxygen signal O2 from an oxygen sensor 135b attached to the exhaust pipe 133.

Various control signals for controlling the operation of the engine 22 are output from the engine ECU 24 via the output port. Examples of the signals which are output from the engine ECU 24 include a control signal for a throttle motor 136 that adjusts the position of the throttle valve 124, a control signal for the fuel injection valve 126, a control signal for the ignition plug 130, and a control signal for the stepping motor 155 that adjusts the opening of the EGR valve 154. The engine ECU 24 is connected to the HVECU 70 via the communication port.

The engine ECU 24 calculates a rotation speed Ne of the engine 22 based on the crank angle θcr from the crank position sensor 140. The engine ECU 24 also estimates an estimated intake air pressure Pine which is an estimated value of the pressure in the surge tank 125 based on the amount of intake air Qa from the air flowmeter 148. Here, the estimated intake air pressure Pine can be calculated, for example, by applying the amount of intake air Qa to a relationship which is determined in advance through experiment or analysis between the amount of intake air Qa and the estimated intake air pressure Pine.

As illustrated in FIG. 1, the planetary gear 30 is configured as a single pinion type planetary gear mechanism and includes a sun gear, a ring gear, a plurality of pinion gears that engages with the sun gear and the ring gear, and a carrier that supports the plurality of pinion gears such that they can turn (rotate) and revolve. A rotor of the motor MG1 is connected to the sun gear of the planetary gear 30. A drive shaft 36 which is connected to driving wheels 39a and 39b via a differential gear 38 is connected to the ring gear of the planetary gear 30. The crank shaft 26 of the engine 22 is connected to the carrier of the planetary gear 30 via a damper 28 as described above. Accordingly, the motor MG1, the engine 22, and the drive shaft 36 can be said to be connected to the sun gear, the carrier, and the ring gear which are three rotary elements of the planetary gear 30 such that they are sequentially arranged in a collinear diagram of the planetary gear 30.

The motor MG1 is configured, for example, as a synchronous generator motor and a rotor thereof is connected to the sun gear of 31 the planetary gear 30 as described above. The motor MG2 is configured, for example, as a synchronous generator motor and a rotor thereof is connected to the drive shaft 36. The inverters 41 and 42 are used to drive the motors MG1 and MG2 and are connected to the battery 50 via a power line 54. A smoothing capacitor 57 is attached to the power line 54. The motors MG1 and MG2 are rotationally driven by causing a motor electronic control unit (hereinafter referred to as a "motor ECU") 40 to control switching of a plurality of switching elements (not illustrated) in the inverters 41 and 42.

Although not illustrated in the drawings, the motor ECU 40 is configured as a microprocessor including a CPU as a main component, and includes a ROM that stores a processing program, a RAM that temporarily stores data, input and output ports, and a communication port in addition to the CPU. Signals from various sensors which are required for controlling the operations of the motors MG1 and MG2, for example, rotational positions θm1 and θm2 from rotational position sensors 43 and 44 that detect rotational positions of the rotors of the motors MG1 and MG2 and phase currents Iu1, Iv1, Iu2, and Iv2 from current sensors 45u, 45v, 46u, and 46v that detect currents flowing in phases in the motors MG1 and MG2, are input to the motor ECU 40 via the input port. Switching control signals for a plurality of switching elements of the inverters 41 and 42 and the like are output from the motor ECU 40 via the output port. The motor ECU 40 is connected to the HVECU 70 via the communication port. The motor ECU 40 calculates electrical angles θe1 and θe2, angular velocities ωm1 and ωm2, or rotation speeds Nm1 and Nm2 of the motors MG1 and MG2 based on the rotational positions ƒm1 and θm2 of the rotors of the motors MG1 and MG2 from the rotational position sensors 43 and 44.

The battery 50 is configured, for example, as a lithium-ion secondary battery or a nickel-hydride secondary battery and is connected to the power line 54. The battery 50 is controlled by a battery electronic control unit (hereinafter referred to as a "battery ECU") 52.

Although not illustrated in the drawings, the battery ECU 52 is configured as a microprocessor including a CPU as a main component, and includes a ROM that stores a processing program, a RAM that temporarily stores data, input and output ports, and a communication port in addition to the CPU. Signals from various sensors which are required for controlling the battery 50 are input to the battery ECU 52 via the input port. Examples of the signals input to the battery ECU 52 include a voltage Vb of the battery 50 from a voltage sensor 51a that is attached between terminals of the battery 50, a current Ib of the battery 50 from a current sensor 51b that is attached to the output terminal of the battery 50, and a temperature Tb of the battery 50 from a temperature sensor 51c that is attached to the battery 50. The battery ECU 52 is connected to the HVECU 70 via the communication port. The battery ECU 52 calculates a state of charge SOC based on an integrated value of the current Ib of the battery 50 from the current sensor 51b. A state of charge SOC is a ratio of an amount of dischargeable electric power from the battery 50 to a full capacity of the battery 50.

Although not illustrated in the drawings, the HVECU 70 is configured as a microprocessor including a CPU as a main component, and includes a ROM that stores a processing program, a RAM that temporarily stores data, input and output ports, and a communication port in addition to the CPU. Signals from various sensors are input to the HVECU 70 via the input port. Examples of the signals input to the HVECU 70 include an ignition signal from an ignition switch 80 and a shift position SP from a shift position sensor 82 that detects an operation position of a shift lever 81. Examples thereof further include an accelerator operation amount Acc from an accelerator pedal position sensor 84 that detects an amount of depression of an accelerator pedal 83, a brake pedal position BR from a brake pedal position sensor 86 that detects an amount of depression of a brake pedal 85, and a vehicle speed V from a vehicle speed sensor 88. As described above, the HVECU 70 is connected to the engine ECU 24, the motor ECU 40, and the battery ECU 52 via the communication port.

The hybrid vehicle 20 having the above configuration travels while switching between a motor-driven travel mode (an EV travel mode) in which the hybrid vehicle 20 travels with rotation of the engine 22 stopped and a hybrid travel mode (an HV travel mode) in which the hybrid vehicle 20 travels with rotation of the engine 22 (while intermittently operating the engine 22).

In the EV travel mode, control of the motor MG2 (switching control of a plurality of switching elements of the inverter 42) is performed such that a required torque Td* which is required for traveling (required for the drive shaft 36) is set based on the accelerator operation amount Acc and the vehicle speed V and the required torque Td* is output from the motor MG2 to the drive shaft 36 with the rotation of the engine 22 stopped by cooperative control of the HVECU 70 and the motor ECU 40. In the EV travel mode, when a starting condition that required power Pe* which is required for the hybrid vehicle and which is set based on the required torque Td* becomes equal to or greater than a start threshold value Pst is satisfied, the engine 22 is started with motoring of the engine 22 using the motor MG1 and the travel mode is switched to the HV travel mode.

In the HV travel mode, operation control of the engine 22 and control of the motors MG1 and MG2 (switching control of the plurality of switching elements of the inverters 41 and 42) are performed such that a travel torque Td* is output to the drive shaft 36 with the rotation (operation) of the engine 22 by cooperative control of the HVECU 70, the engine ECU 24, and the motor ECU 40. In the HV travel mode, when a stopping condition that the required power Pe* which is set in the same way as described above becomes equal to or less than a stop threshold value Psp which is less than the start threshold value Pst is satisfied, the operation of the engine 22 is stopped and the travel mode is switched to the EV travel mode.

The engine ECU 24 performs operation control of the engine 22 (such as intake air amount control, fuel injection control, or ignition control), EGR control of the EGR device 150, or the like based on a target rotation speed Ne* or a target torque Te* of the engine 22 when the engine 22 operates. Details of the operation control of the engine 22 will not be described. In the EGR control of the EGR device 150, when an EGR condition is satisfied, a target EGR volume Vegr* is set based on an operating point (the target rotation speed Ne* and the target torque Te*) of the engine 22 or the like, a target opening Ov* of the EGR valve 154 is set based on the target EGR volume Vegr*, and the stepping motor 55 is controlled based on the target opening Ov* of the EGR valve 154. On the other hand, when the EGR condition is not satisfied, the target opening Ov* of the EGR valve 154 is set to 0 and the stepping motor 55 is controlled based on the target opening Ov* of the EGR valve 154. A condition that warming-up of the engine 22 is completed, a condition that the target torque Te* of the engine 22 is in an EGR execution area, or the like is used as the EGR condition.

In the hybrid vehicle 20 according to this embodiment, when a diagnosis condition is satisfied, the HVECU 70 performs catching diagnosis for diagnosing whether foreign matter is caught between the valve seat 154a and the valve member 154b of the EGR valve 154 by comparison between an intake air pressure difference ΔPin (=|Pind−Pine|) which is a difference between a detected intake air pressure Pind and an estimated intake air pressure Pine and a threshold value ΔPinref. In the catching diagnosis, a foreign matter caught flag Ff is set to 0 when it is determined that foreign matter is not caught by the EGR valve 154, and the foreign matter caught flag Ff is set to 1 when it is determined that foreign matter is caught by the EGR valve 154. For example, a condition that the EGR condition is not satisfied (the target opening Ov* of the EGR valve 154 is 0) and the foreign matter caught flag Ff is set to 0 is used as the diagnosis condition.

In the hybrid vehicle 20 according to this embodiment, when the engine 22 is performing an idling operation (a no-load operation), the engine 22 is controlled such that the rotation speed Ne of the engine 22 reaches a predetermined rotation speed N1 (for example, about 1,000 rpm) when the foreign matter caught flag Ff is set to 0, and the engine 22 is controlled such that the rotation speed Ne of the engine 22 reaches a predetermined rotation speed N2 greater than the predetermined rotation speed N1 (for example, a rotation speed several tens of rpm to several hundreds of rpm greater than the predetermined rotation speed N1) when the foreign matter caught flag Ff is set to 1. This is because, when foreign matter is caught in the EGR valve 154, engine stalling is more likely to occur when the EGR condition is not satisfied (when the target opening Ov* of the EGR valve 154 is 0) in comparison with a case in which foreign matter is not caught in the EGR valve 154.

Figure 3:
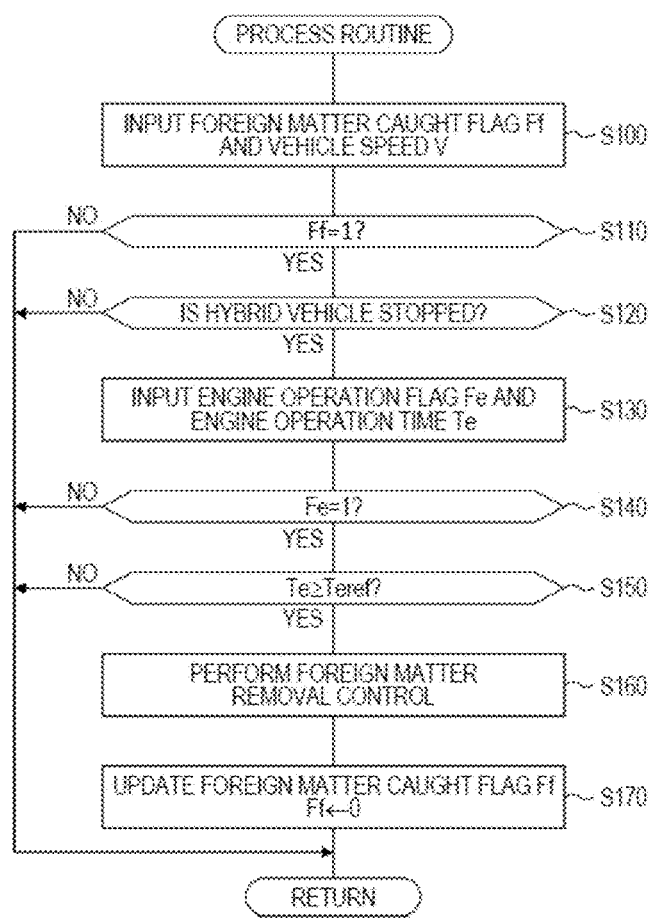
FIG. 3 is a flowchart illustrating an example of a process routine which is performed by an engine ECU 24.

The operation of the hybrid vehicle 20 according to the embodiment having the above-mentioned configuration, particularly, the operation when foreign matter is caught in the EGR valve 154, will be described below. FIG. 3 is a flowchart illustrating an example of a process routine which is performed by the engine ECU 24. This process routine is repeatedly performed.

When the process routine illustrated in FIG. 3 is performed, first, data such as the foreign matter caught flag Ff and the vehicle speed V is input by the engine ECU 24 (Step S100). Here, a value which is set as described above is input as the foreign matter caught flag Ff. A value which is detected by the vehicle speed sensor 88 is input as the vehicle speed V from the HVECU 70 by communication.

When data is input in this way, the value of the foreign matter caught flag Ff is checked (Step S110). When the value of the foreign matter caught flag Ff is 0, it is determined that foreign matter is not caught in the EGR valve 154 and the process routine ends without performing foreign matter removal control which will be described later.

When it is determined in Step S110 that the value of the foreign matter caught flag Ff is 1, it is determined that foreign matter is caught in the EGR valve 154 and the vehicle speed V is compared with a threshold value Vref (Step S120). Here, the threshold value Vref is a threshold value for determining whether the vehicle stops and, for example, 0 km/h or a greater value is used as the threshold value Vref. When the vehicle speed V is greater than the threshold value Vref, it is determined that the vehicle does not stop and the process routine ends without performing foreign matter removal control.

When it is determined in Step S110 that the vehicle speed V is equal to or less than the threshold value Vref, it is determined that the vehicle stops and an engine operation flag Fe or an engine operation time Te is input (Step S130). Here, the engine operation flag Fe is a flag indicating whether the engine 22 is operating, and a value which is set in an engine operation flag setting routine which is not illustrated is input. In the engine operation flag setting routine, the value of the engine operation flag Fe is switched from 0 to 1 when starting of the engine 22 is completed (when the operation is started), and the value of the engine operation flag Fe is switched from 1 to 0 when the operation of the engine 22 ends. The engine operation time Te is an elapsed time after starting of the engine 22 has been completed (from the operation start) and a time which is measured by a timer which is not illustrated is input.

When data is input in this way, the value of the engine operation flag Fe is checked (Step S140). When the value of the engine operation flag Fe is 0, it is determined that the engine 22 is not operating and the process routine ends without performing foreign matter removal control. At this time, the engine operation time Te is reset to 0.

When it is determined in Step S140 that the value of the engine operation flag Fe is 1, it is determined that the engine 22 is operating and the engine operation time Te is compared with a threshold value Teref (Step S150). Here, the threshold value Teref is a threshold value for adjusting the time at which foreign matter removal control is started and, for example, about 10 seconds is used. When the engine operation time Te is less than the threshold value Teref, the process routine ends without performing foreign matter removal control.

When it is determined in Step S150 that the engine operation time Te is equal to or greater than the threshold value Teref, foreign matter removal control is performed (Step S160). Thereafter, the value of the foreign matter caught flag Ff is updated from 1 to 0 (Step S170), and the process routine ends. Here, in the foreign matter removal control, the target opening Ov* is set such that the EGR valve 154 is repeatedly opened and closed (the opening of the EGR valve 154 increases and decreases repeatedly), and the stepping motor 155 is controlled based on the set target opening Ov*. Accordingly, it is possible to remove foreign matter which is caught between the valve seat 154*a* and the valve member 154*b* of the EGR valve 154.

When foreign matter removal control is performed during travel, the rotation speed Ne of the engine 22 may change due to a change in the opening of the EGR valve 154 and there is a likelihood that an uncomfortable feeling such as an accelerating feeling or a decelerating feeling will be given to a driver. In consideration thereof, in this embodiment, it is assumed that foreign matter removal control is performed during stoppage. Accordingly, it is possible to prevent an uncomfortable feeling such as an accelerating feeling or a decelerating feeling from being given to a driver.

In this embodiment, when the engine operation time Te is less than the threshold value Teref during stoppage, foreign matter removal control is not performed. Accordingly, it is possible to avoid performing of foreign matter removal control when combustion becomes unstable during starting of the engine 22 (during motoring of the engine 22 using the motor MG1 or the like) or immediately after starting of the engine 22 has been completed.

When foreign matter removal control is performed during stoppage, there is a likelihood that the rotation speed Ne of the engine 22 will change. Accordingly, when foreign matter can be removed without performing foreign matter removal control, it is preferable to perform foreign matter removal control as little as possible. When the vehicle starts for a relatively short time from start of the operation of the engine 22 during stoppage, the EGR condition is satisfied, and the target opening Ov* of the EGR valve 154 is increased, there is a likelihood that foreign matter will be removed without performing foreign matter removal control during stoppage. In consideration thereof, in this embodiment, foreign matter removal control is not performed when an elapsed time from starting of the operation of the engine 22 is less than the predetermined time Teref during stoppage.

An example of the case in which the operation time Te of the engine 22 is equal to or greater than the threshold value Teref during stoppage is a case in which a state of charge SOC of the battery 50 decreases in a parked state, the engine 22 is started, and power generation in the motor MG1 is performed to charge the battery 50 using power from the engine 22.

Figure 4:
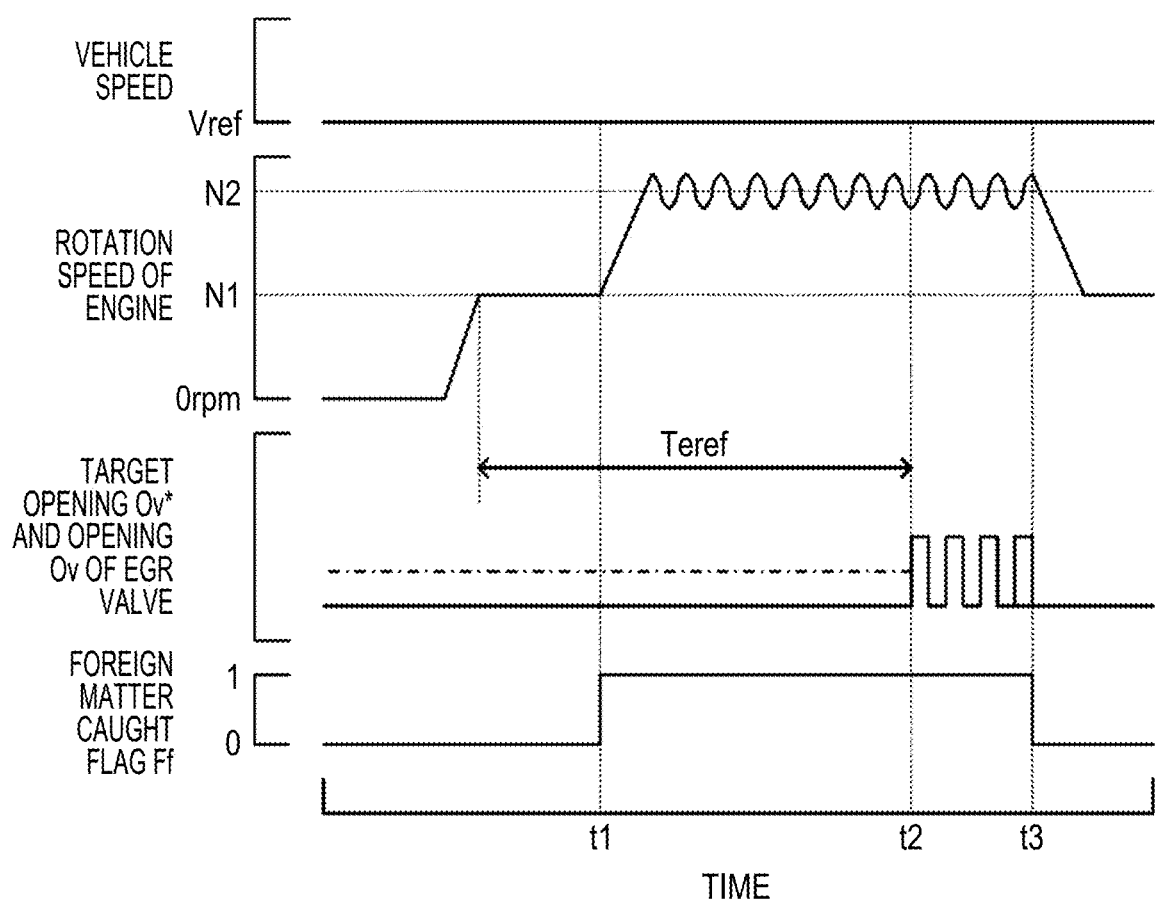
FIG. 4 is a diagram illustrating an example in which foreign matter removal control is performed.

FIG. 4 is a diagram illustrating an example in which foreign matter removal control is performed. As illustrated in the drawing, when the operation of the engine 22 is started, the engine 22 is performing an idling operation at a predetermined rotation speed N1, and it is determined that foreign matter is caught in the EGR valve 154 (time t1), the value of the foreign matter caught flag Ff is switched from 0 to 1 and the rotation speed Ne of the engine 22 is increased from the predetermined rotation speed N1 to a predetermined rotation speed N2. When the vehicle speed is equal to or less than the threshold value Vref and the operation time Te of the engine 22 is equal to or greater than the threshold value Teref (time t2), foreign matter removal control is performed. Accordingly, it is possible to remove foreign matter while preventing an uncomfortable feeling such as an accelerating feeling or a decelerating feeling from being given to a driver. When the foreign matter removal control ends (time t3), the value of the foreign matter caught flag Ff is switched from 1 to 0 and the rotation speed Ne of the engine 22 is decreased to the predetermined rotation speed N1. When foreign matter is removed, the opening Ov of the EGR valve 154 substantially matches the target opening Ov*.

In the hybrid vehicle according to the embodiment described above, when foreign matter caught in the EGR valve 154 is detected, the hybrid vehicle stops, and the operation time Te of the engine 22 is equal to or greater than the threshold value Teref, foreign matter removal control for opening and closing the EGR valve 154 is performed. Accordingly, it is possible to prevent an uncomfortable feeling such as an accelerating feeling or a decelerating feeling from being given to a driver.

In the hybrid vehicle 20 according to the embodiment, when foreign matter caught in the EGR valve 154 is detected, the hybrid vehicle stops, and the operation time Te of the engine 22 is equal to or greater than the threshold value Teref, the foreign matter removal control is performed. However, when foreign matter caught in the EGR valve 154 is detected and the hybrid vehicle stops, foreign matter removal control may be performed without considering the engine operation time Te.

In the hybrid vehicle 20 according to the embodiment, the EGR valve 154 is driven by the stepping motor 155. However, the EGR valve 154 may be driven by another motor or the like.

Correspondence between principal elements in the embodiment and principal elements in the claims will be described below. In the embodiment, the engine 22 is an example of an "engine," the EGR device 150 is an example of an "exhaust gas recirculation device," the motor MG2 is an example of a "motor," and the engine ECU 24 is an example of a "control device."

The correspondence between the principal elements in the embodiment and the principal elements in the claims does not limit the elements of the disclosure, because the embodiment is an example for specifically describing an aspect of the disclosure. That is, it should be noted that the disclosure should be construed based on the description thereof and the embodiment is only a specific example of the disclosure.

While an embodiment of the disclosure has been described above, the disclosure is not limited to the embodiment and can be modified in various forms without departing from the gist of the disclosure.

The disclosure is applicable to the manufacturing industry of hybrid vehicles.

What is claimed is:

1. A hybrid vehicle, comprising:
an engine;
an exhaust gas recirculation device including
a communication pipe that allows an exhaust pipe and an intake pipe of the engine to communicate with each other, and
a valve that is provided in the communication pipe;
a traveling motor; and
a control device configured to
perform foreign matter removal control for opening and closing the valve when foreign matter caught in the valve is detected and the hybrid vehicle stops;
prohibit the foreign matter removal control when the foreign matter caught in the valve is detected, the hybrid vehicle stops, and a predetermined time does not elapse from starting of the engine; and
perform the foreign matter removal control when the foreign matter caught in the valve is detected, the hybrid vehicle stops, and the predetermined time elapses from starting of the engine,
wherein the engine is operating for the predetermined time.

2. The hybrid vehicle according to claim 1, further comprising a pressure sensor configured to detect a pressure in the intake pipe as a detected intake air pressure, wherein
the control device is configured to:
estimate the pressure in the intake pipe as an estimated intake air pressure; and determine whether the foreign matter is caught in the valve through comparison of an intake air pressure difference between the detected intake air pressure and the estimated intake air pressure with a threshold value.

* * * * *